No. 660,217. Patented Oct. 23, 1900.
C. E. ISBILLS.
ELECTRIC MOTOR WHEEL.
(Application filed Dec. 13, 1899.)

(No Model.) 3 Sheets—Sheet 1.

WITNESSES:
A. J. de Bonneville
Sidney D. Lowe.

INVENTOR
C. E. Isbills.
BY
Edward P. Thompson
ATTORNEY

No. 660,217. Patented Oct. 23, 1900.
C. E. ISBILLS.
ELECTRIC MOTOR WHEEL.
(Application filed Dec. 13, 1899.)
(No Model.) 3 Sheets—Sheet 2.
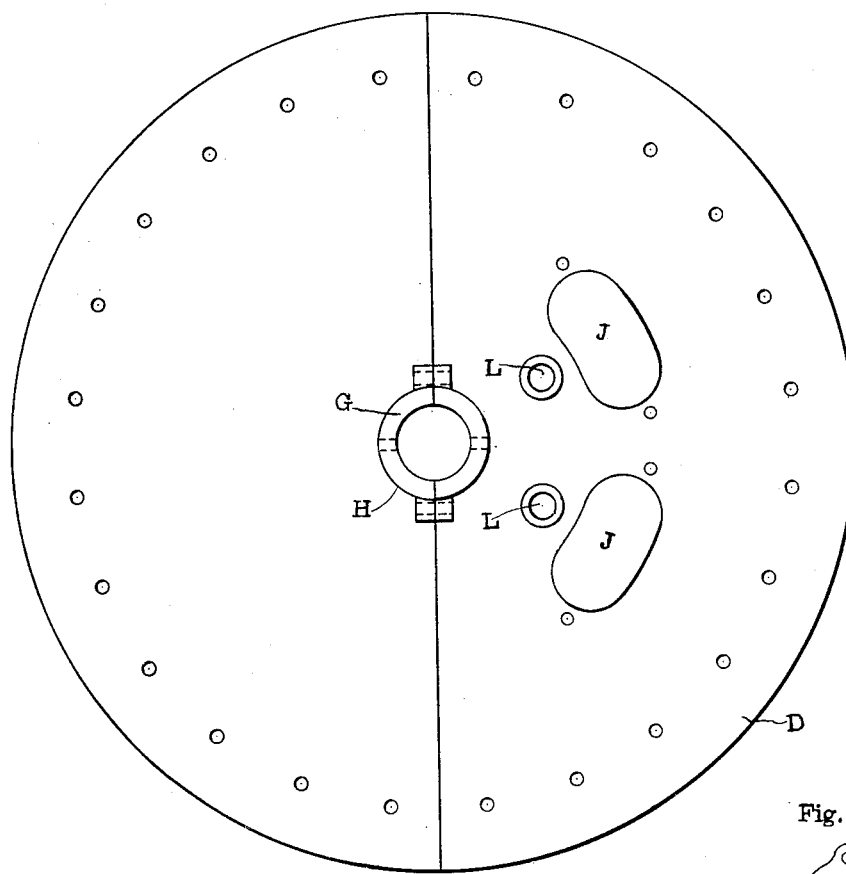
Fig. 3.
Fig. 3a.
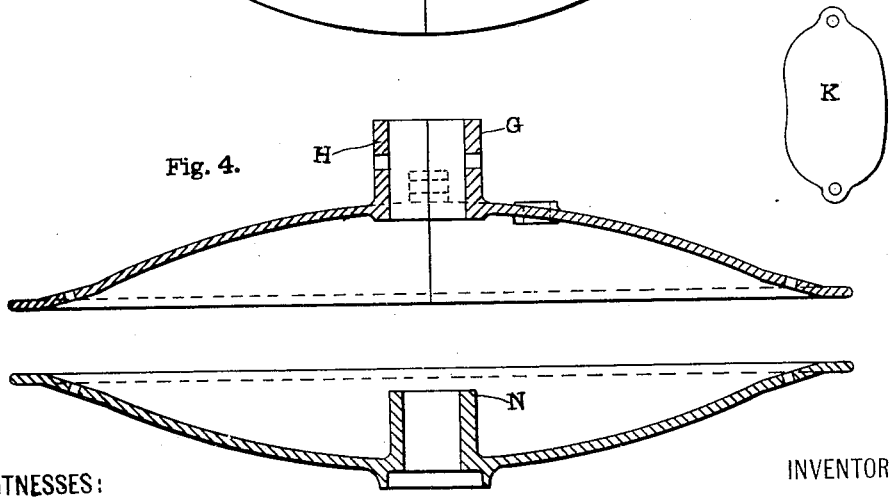
Fig. 4.
WITNESSES:
A. A. de Bonneville
Sidney D. Lowe
INVENTOR
C. E. Isbills.
BY
Edward P. Thompson
ATTORNEY
THE NORRIS PETERS CO., PHOTO-LITHO., WASHINGTON, D. C.

No. 660,217. Patented Oct. 23, 1900.
C. E. ISBILLS.
ELECTRIC MOTOR WHEEL.
(Application filed Dec. 13, 1899.)
(No Model.) 3 Sheets—Sheet 3.
Fig. 5.
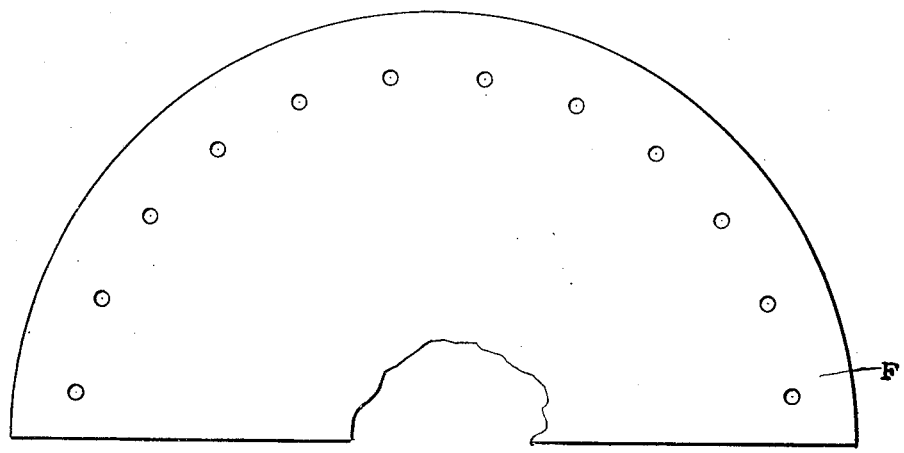
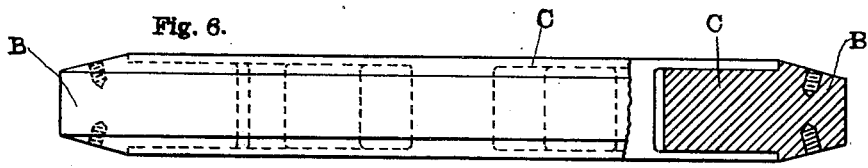
Fig. 6.
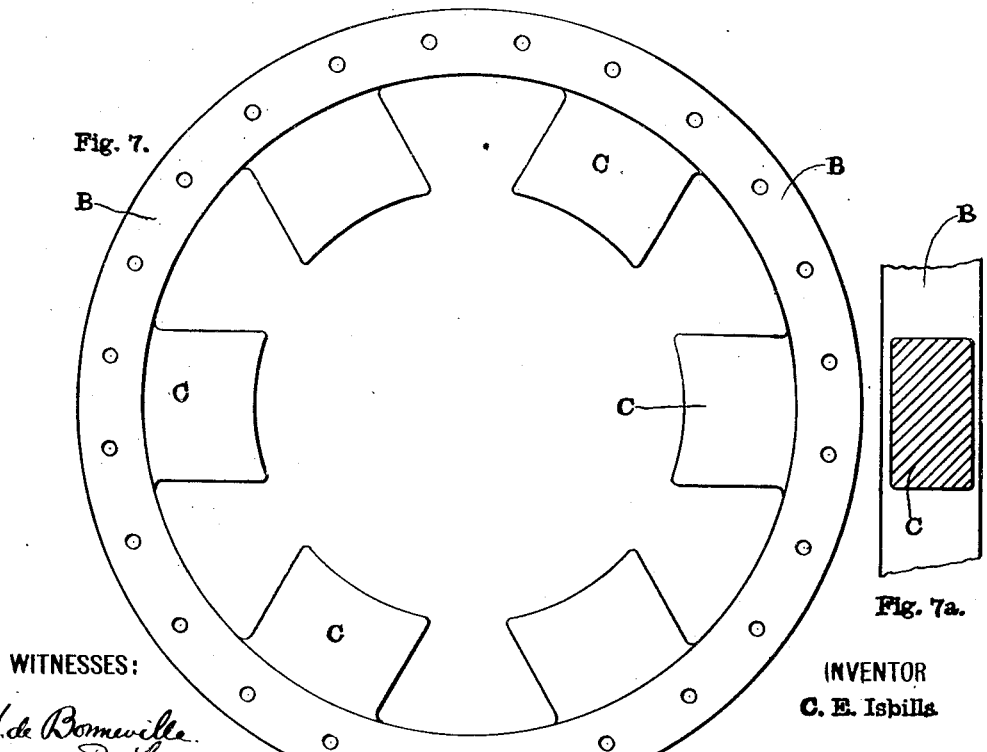
Fig. 7.
Fig. 7a.
WITNESSES:
A. A. de Bonneville.
Sidney D. Lowe.
INVENTOR
C. E. Isbills.
BY
Edward P. Thompson
ATTORNEY

UNITED STATES PATENT OFFICE.

CHARLES E. ISBILLS, OF PASSAIC, NEW JERSEY.

ELECTRIC-MOTOR WHEEL.

SPECIFICATION forming part of Letters Patent No. 660,217, dated October 23, 1900.

Application filed December 13, 1899. Serial No. 740,202. (No model.)

*To all whom it may concern:*

Be it known that I, CHARLES E. ISBILLS, a citizen of the United States of America, and a resident of Passaic, in the county of Passaic and State of New Jersey, have invented certain new and useful Improvements in Electric-Motor Wheels, of which the following is a specification.

My present invention relates to the mechanical construction of a wheel generally intended for a vehicle or car, but particularly adapted for use on an automobile, the wheel being so constructed that the motor is within the wheel. The tire of the wheel is slipped upon the field-magnet ring and held between dished webs, which are secured to the magnet-ring, with their circumferential edges projecting for holding the tire and their central portions being formed with bearings for the axle of the automobile, the armature of the motor being fixed to said axle. Handholes are cut in one of the webs and are provided with removable covers, the commutator and brushes being within reach of the handholes within the webs and located between the armature of one of the webs, the collector-rings being located between the armature and the other web and serving to communicate the current from the fixed portions of the automobile to the revolving field-magnets.

All the details of the invention are described by reference to the accompanying drawings.

Figure 2:
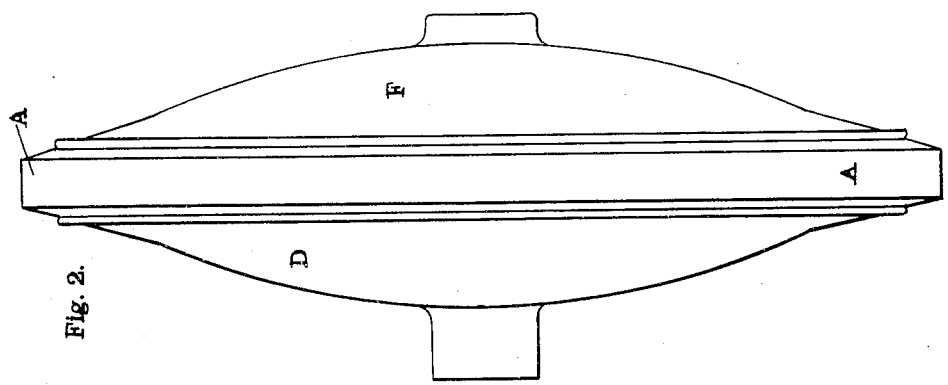
Figure 1:
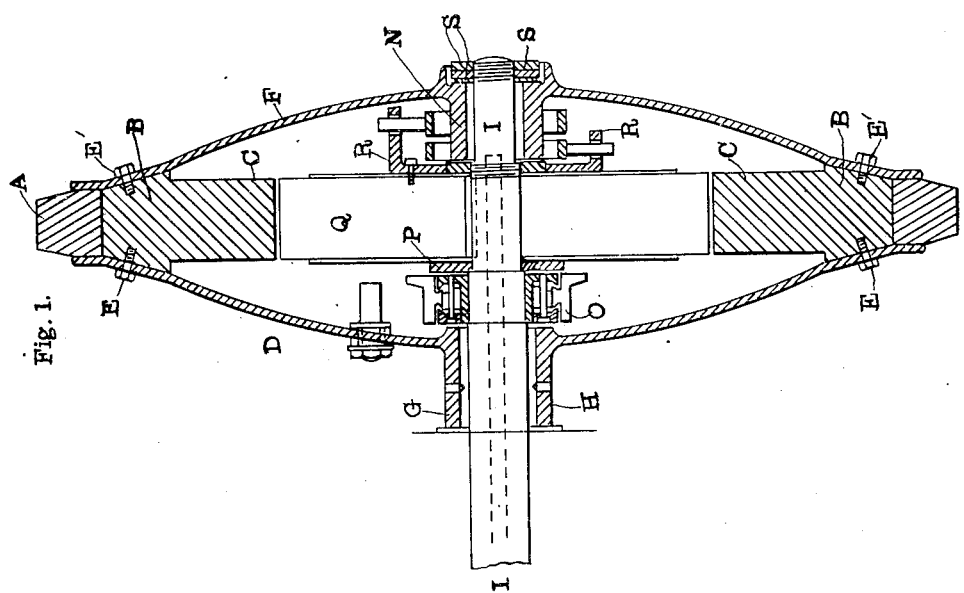

Figure 1 is a vertical section of the electric-motor wheel, some of the smaller circular parts not being sectioned. Fig. 2 is an outside elevation of the whole wheel looking perpendicularly toward the axle. Fig. 3 is a side elevation of that web which is provided with handholes. Fig. 3ª is a front view of one of the covers for the handholes, both being alike. Fig. 4 is a vertical section of the two webs removed from the rest of the wheel, but placed in the same relative position to each other. Fig. 5 is a side elevation of the other dished web. Fig. 6 is a vertical elevation, partly in section, of the field-magnet ring looking perpendicularly to the axis. Fig. 7 is a side elevation of the same ring. Fig. 7ª is a portion of the ring broken out with the core shown in section.

A is the tire, mounted upon the field-magnet ring B, having the pole-pieces or cores C, which, as in any motor, may be of the desired number, as my invention has nothing to do with the number of field-magnet poles.

D is a web with rounded surfaces, conveniently termed a "dished" web, secured by screws E to the magnet-ring B and having its circumferential portion projecting beyond the ring B, while F is a similar web on the other side of the ring B, having its edge also projecting, so that the tire A is held by the projecting edges upon the ring B in an effective manner. The web D is made in halves and is formed with half a bearing G and H upon each half. The bolts E while holding the halves to the ring B at the same time hold the halves to form one whole. The bearings G and H project outward from the wheel and surround the axle I. There are handholes J cut through the web. These may be covered up by means of covers K. (Shown in Fig. 3ª.) There are two other holes L in the same web for holding brush-holders, one of which is shown at M. There is a bearing N formed centrally upon the web F and extending into the wheel, considered as a whole, and said web is fastened by screws E' to the ring B. At the inner end of the bearing made of the halves G and H the shaft is made smaller to receive the commutator O, whose details are the same as in commutators generally. Just beyond the commutator the shaft is made smaller yet to receive the washer P. Next to the washer is the armature Q, bearing against said washer. Just beyond the armature Q the axle is made smaller to receive the collector brush-holder R, whose central portion is screwed upon the axle against the armature Q. The axle I is made smaller beyond the central portion of the brush-holder, and surrounding this last and smaller portion is the bearing N, and, finally, nuts S hold the bearing upon the axle. Of course bushings of any suitable kind should be inserted between the axle I on the one hand and the bearings G, H, and N on the other hand.

The operation of the device consists simply of the same kind as takes place in other motors, the novelty being in the construction and not in any new mode of operation. The armature being fixed to the axle, the electric energy causes the field-magnet to rotate, which, being a wheel, causes the vehicle to travel.

The webs completely inclose all the elements of the electric motor—such as the armature, field-magnet coils, commutator, collector, and brush-holders—in a perfectly dust-proof manner.

I do not claim, broadly, an electric-motor wheel for vehicles; but

I claim as my invention—

1. In an electric-motor wheel, the combination with the tire, of a field-magnet ring, webs extending in a single piece beyond said ring, a tire surrounding said ring and located between the extensions of said webs, an axle, and bearings formed respectively in a single piece with said webs and surrounding said axle.

2. An electric-motor wheel consisting of the combination of a field-magnet ring having internally-radiating cores and a circular contour, a tire mounted at the circumference upon said ring, webs having central bearings respectively formed thereon, secured to said ring and projecting beyond the same for the purposes described of holding said tire upon said ring, and an axle having the armature and commutator of the motor fixed thereon, brush-holders for the commutator carried upon one of the webs, and collector-rings mounted upon the bearing of the other web, and a brush-holder for the collector-rings screwed upon said axle against said armature.

3. In an electric-motor wheel, the combination with a field-magnet ring, a dished web fastened to said ring on one side and having a bearing formed in a single piece with said web and extending away from the armature of said motor, a commutator on the axle of the motor between said bearing and said armature, a second dished web secured to the other side of said ring and having a bearing formed in a single piece with said web and extending toward said armature, and carrying collector-rings, suitable brushes being provided for said commutator and said rings, and the field-magnet, armature, commutator, collector and brushes being completely inclosed in a dust-proof manner within said webs.

In testimony whereof I have hereunto subscribed my name this 9th day of December, 1899.

CHAS. E. ISBILLS. [L. S.]

Witnesses:
FREDERICK B. CONANT,
W. VAN H. FILKINS.